(12) United States Patent
Park (10) Patent No.: US 7,682,272 B2
(45) Date of Patent: Mar. 23, 2010

(54) DRIVING DEVICE OF ARMATURE BALANCE MACHINE

(76) Inventor: Kye Jung Park, 2014-98, Daemyung 2.8-dong, Nam-gu, Taegu-city 705-032 (KR)

( * ) Notice: Subject to any disclaimer, the term of this patent is extended or adjusted under 35 U.S.C. 154(b) by 59 days.

(21) Appl. No.: 11/910,457

(22) PCT Filed: Nov. 5, 2004

(86) PCT No.: PCT/KR2004/002846

§ 371 (c)(1),
(2), (4) Date: Oct. 1, 2007

(87) PCT Pub. No.: WO2006/049359

PCT Pub. Date: May 11, 2006

(65) Prior Publication Data

US 2008/0191646 A1    Aug. 14, 2008

(51) Int. Cl.
*G01M 1/00* (2006.01)
*G01M 1/16* (2006.01)
(52) U.S. Cl. .................. 474/137; 73/473; 73/462; 73/466
(58) Field of Classification Search ............ 474/9, 474/3, 137, 85, 86, 87, 118; 310/90; 73/473
See application file for complete search history.

(56) References Cited

U.S. PATENT DOCUMENTS

| | | | | | |
|---|---|---|---|---|---|
| 1,486,115 A | * | 3/1924 | Allen | .................... | 384/218 |
| 1,588,205 A | * | 6/1926 | Stephenson | ................... | 73/473 |
| 1,976,588 A | * | 10/1934 | Thearle | ..................... | 310/51 |
| 2,722,465 A | * | 11/1955 | Ellis | ............................ | 384/220 |
| 2,758,487 A | * | 8/1956 | Erickson | ..................... | 477/27 |
| 2,891,241 A | * | 6/1959 | Fibikar | ........................ | 73/462 |
| 3,854,339 A | * | 12/1974 | Muller | ......................... | 73/462 |
| 3,895,536 A | * | 7/1975 | Behm | ........................... | 73/462 |
| 4,286,467 A | * | 9/1981 | Kober | ......................... | 73/460 |
| 4,628,733 A | * | 12/1986 | Nystuen et al. | ............... | 73/462 |
| 5,255,566 A | * | 10/1993 | Okumura | ..................... | 73/660 |
| 2002/0014803 A1 | * | 2/2002 | Trionfetti | ..................... | 310/51 |

* cited by examiner

*Primary Examiner*—Robert A Siconolfi
*Assistant Examiner*—Henry Liu
(74) *Attorney, Agent, or Firm*—Joseph H. Kim; JHK Law (57) ABSTRACT

Disclosed herein is a driving device of armature balance machine, in which a driving motor is formed on the same centerline of the armature, a hinge block pivot-connected by the hinge shaft is installed in the finger mounter of the bracket in such a manner that the hinge shaft is disposed on the same centerline of the driving motor and the variable roller is formed at one side of the hinge shaft, the finger provided with a complementary roller is symmetrically constructed about the centerline of the driving motor, and thereafter a belt is wound around each roller, so that the construction of the driving motor can be simplified and thus the length of the belt is minimized and the vibration of the belt is minimized, thereby enabling to keep the tension applied to the belt in an optimum state, due to the facts that the tension of the belt is symmetrical about the centerline of the belt and also the variable roller i.e. the tension adjusting means is not operated by the belt.

3 Claims, 13 Drawing Sheets

FIG. 1

Prior Art

FIG. 2

Prior Art

FIG. 3

A: Closed loop-type belt driving
   Common method. High precision.
   Uneasy replacement work of armature.
   Not suitable for automatic machines.

B: Lower tangential belt driving
   Easy automatic replacement of armature.
   Suitable for automatic machine.
   Low precision due to unstable rotation of armature.

C: Double tangential belt driving
   Can be used for automatic machine.
   Relatively stable rotation of armature.
   Many roller and long belt.
   High probability of errors due to complicated structure.

D: Belt driving including closed loop at both sides
   Most suitable for automatic machine.
   Precision measurement due to large contact area with outer surface of armature.

Prior Art

FIG. 4

Prior Art

DRIVING DEVICE OF ARMATURE BALANCE MACHINE

TECHNICAL FIELD

This invention relates to a driving device of an armature balance machine, which enables more accurate armature balance measurement by providing a simplified construction of a driving device. More specifically, the invention relates to such a driving device, in which a driving motor with a driving roller connected in series thereto is formed in a bracket so as to move upwards and downwards, a pair of hinge blocks connected to each other through a hinge shaft is rotatably mounted to the upper side of the bracket respectively in such a way that the hinge shaft is disposed on the same centerline as the driving roller, a variable roller is constructed at one side of the hinge shaft so as to move upwards and downwards, a pair of fingers provided with a complementary roller respectively is constructed in such a manner as to be symmetrical about the centerline of the driving roller, and a belt is wound around each roller, thereby enabling more accurate armature balance measurement.

BACKGROUND ART

Figure 1:
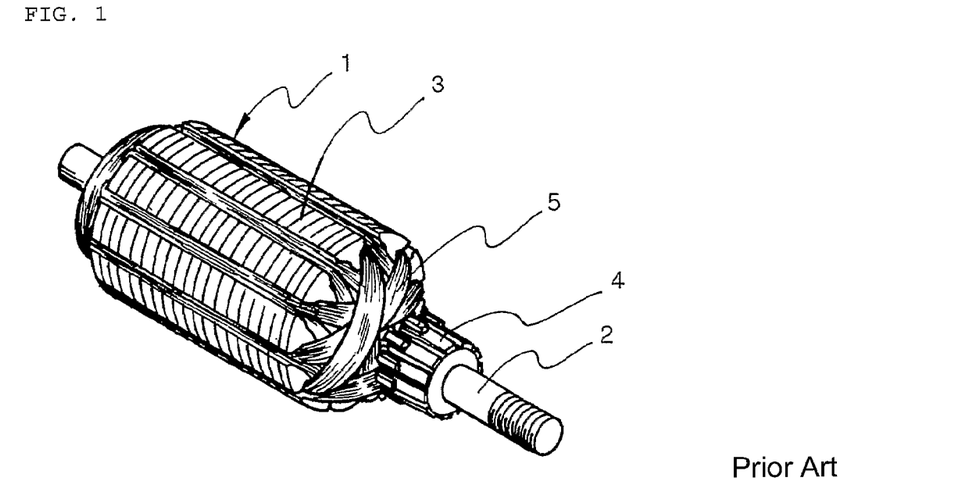
FIG. 1 is a perspective view of a general armature.

In general, as shown in FIG. 1, an armature acting as a rotator installed inside a motor comprises multiple cores 3 layered on a rotating shaft 2, a commutator 4 formed at one side of the rotating shaft 2, and a coil 5 wound around the core 3 and with its end thereof bonded to the commutator 4. The weight balance of an armature as constructed above is an important factor of the performance of a motor. If the weight distribution of the armature 1 is not uniform, it leads to a critical cause for the impedance of high-speed rotation, along with the irregular rotation, and the vibration and noise associated therewith.

Figure 2:
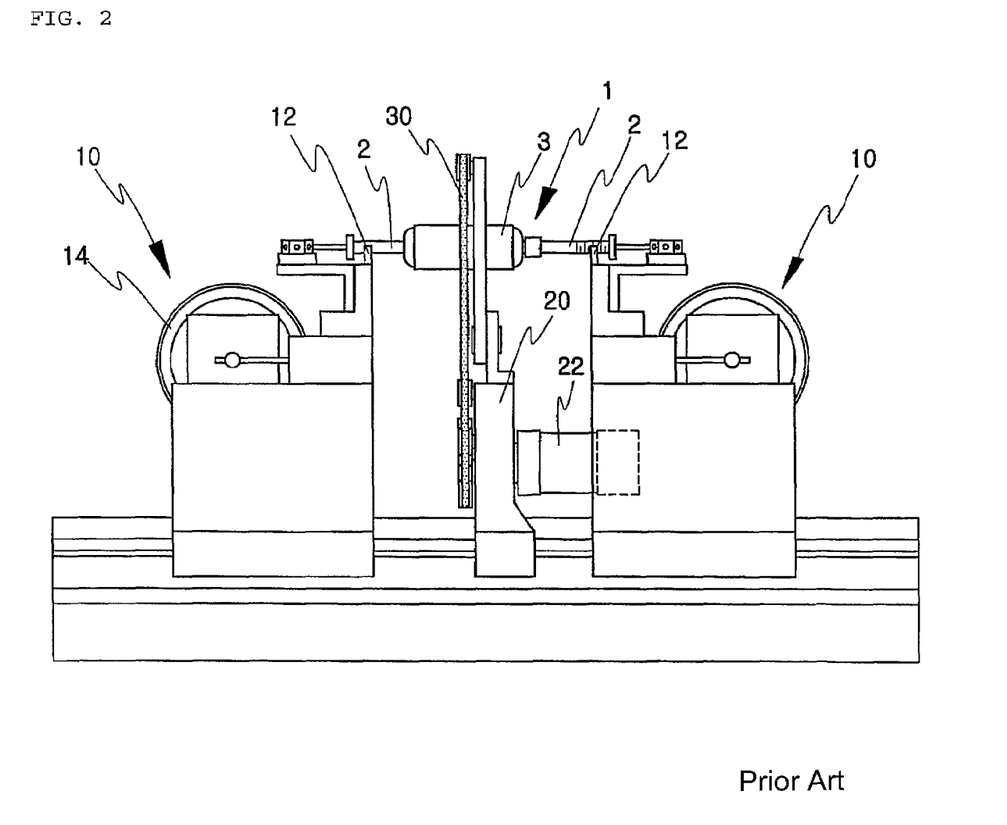
FIG. 2 is a schematic elevation view of a conventional armature balance machine.
Figure 3:
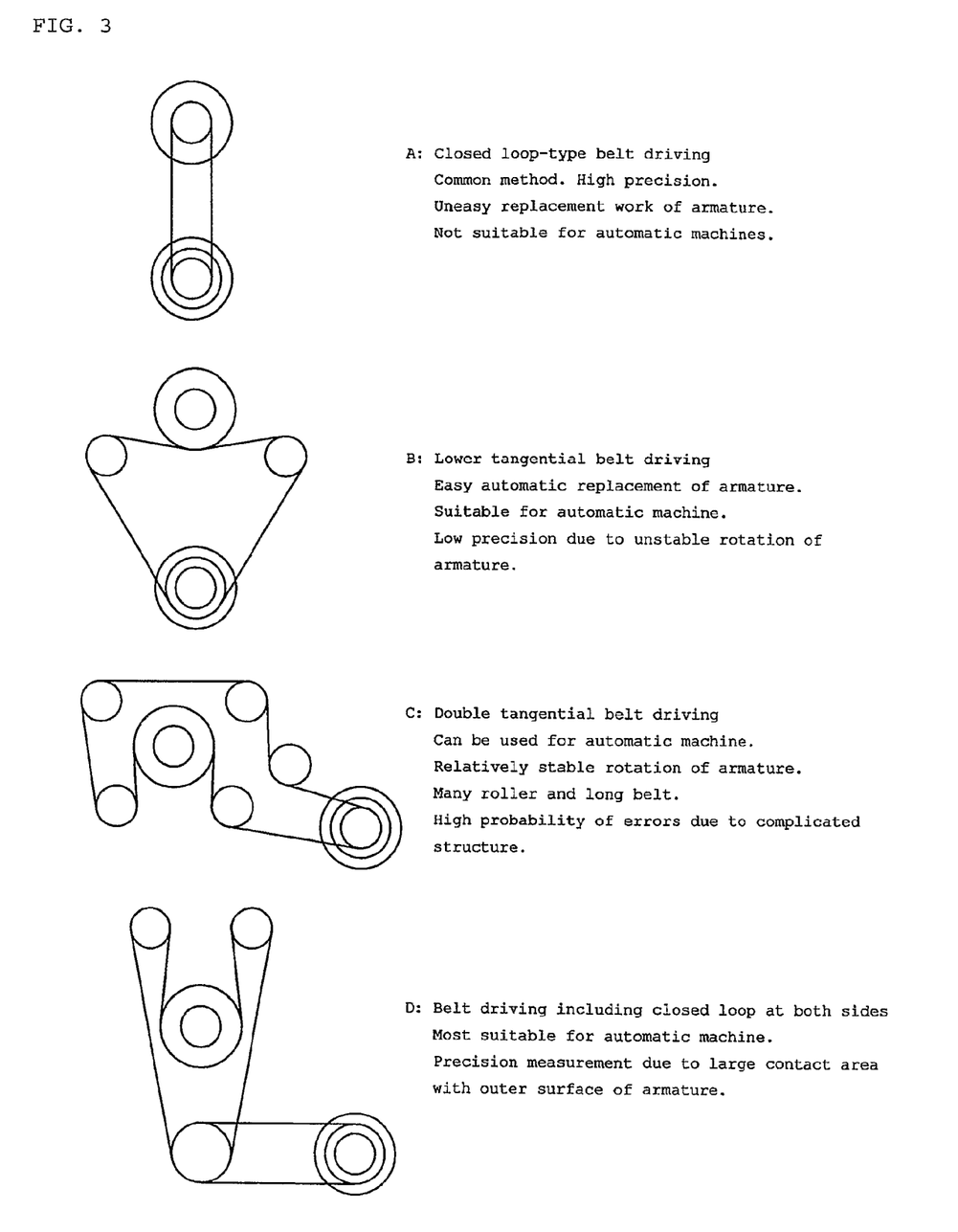
FIG. 3 schematically illustrates the driving mode of the conventional armature balance machine.
Figure 4:
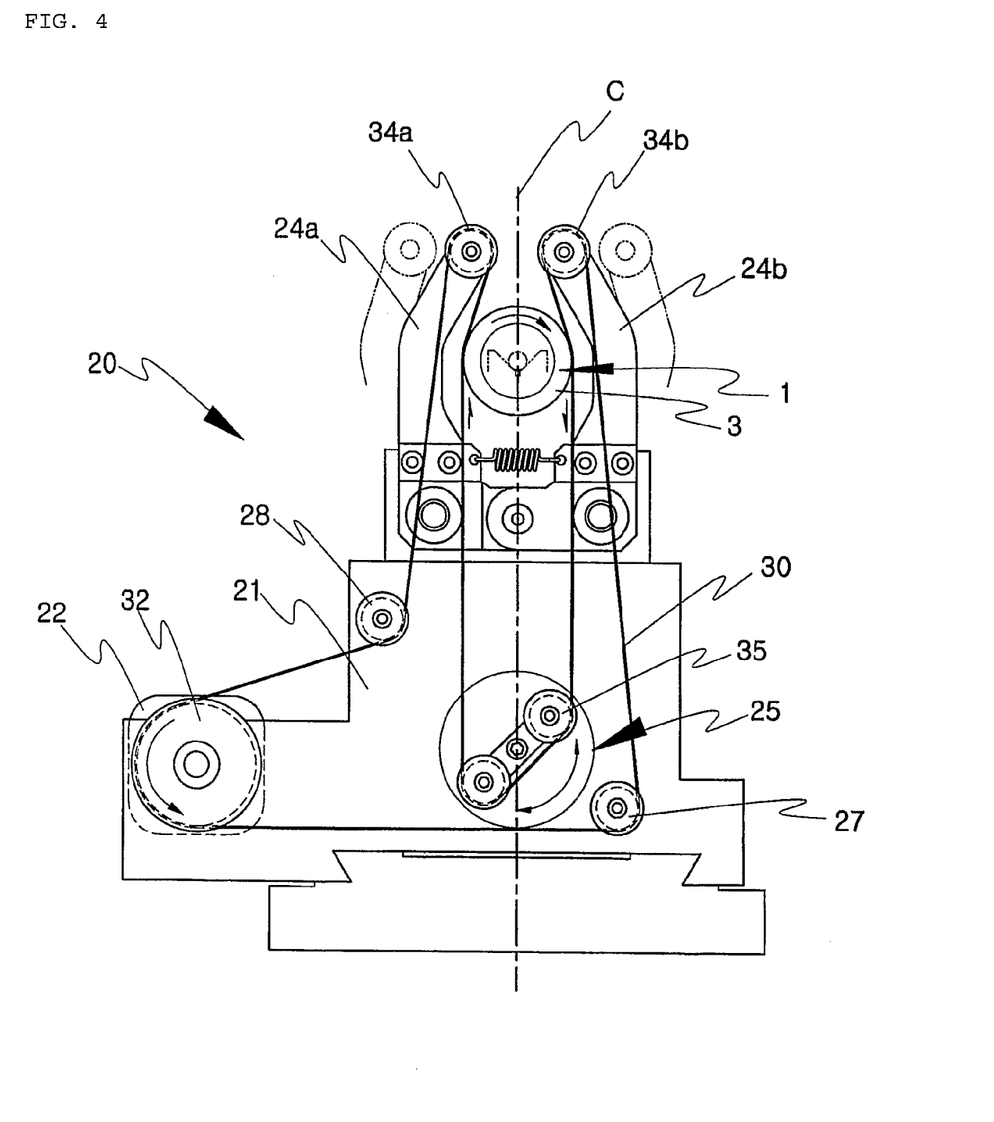
FIG. 4 illustrates a side view of a driving device of the conventional armature balance machine.

Therefore, a balance measuring process using an armature balance machine is generally included in the entire manufacturing process of an armature. FIG. 2a is a schematic elevation view of a conventional armature balance machine. Referring to FIG. 2a, the construction of the conventional armature balance machine is described. The conventional armature balance machine includes a belt 30 for transferring the rotating power of a driving motor 22 to the outer peripheral surface of a core 3 of an armature 1, an armature driving device 20 having multiple rollers with the belt 30 wound therearound, a pair of v-blocks for supporting both end sides of a rotation shaft 2 of the armature 1, and a common measuring device 14 such as a piezoelectric element or a moving coil sensor for detecting the vibration of the armature 1 transferred from the v-block, thereby provide a balance measuring device 10.

On the other hand, in the conventional armature balance machine including the balance measuring device 10 and the armature driving device 20, various driving methods are currently used for drive the armature thereof, as shown in FIG. 2b. Among them, a belt driving method including a closed loop at both sides of D-type is most generally used for the automation machinery. In this method, replacement work of the armature to be measured is easy, and a balance measuring speed of stable range due is reached within a short time period to the big moment of inertia of the armature, resulting in a fast measurement of armature balance. Also, the belt is wound wrapping the both sides of the armature, thereby providing a wide contact area and thus enabling a stable and accurate measurement without a variation.

As one example of the above-described method, a construction of a typical armature driving device 20 of the armature balance machine is described in greater detail, referring to FIG. 2c. That is, a driving motor 22 with a driving roller connected thereto is mounted at one side of the bracket 21. Complementary rollers 34a, 34b are installed in the end of the upper side of the bracket 21, and a pair of fingers 24a, 24b which varies depending on the diameter of the core 3 of the armature 1 are formed. A tension adjusting mechanism 25 equipped with other complementary rollers 35 and other multiple complementary rollers are formed in desired positions of the bracket 21 and a belt 30 is wound around each roller 27, 28, 32, 34a, 34b, and 35. In the drawing, an unexplained reference numeral 'C' denotes a virtual centerline of the armature.

DISCLOSURE OF INVENTION

Technical Problem

However, as described above, in the conventional driving device of the armature balance machine, the driving motor 22 is formed at one side of the bracket 21 so that the whole driving device 20 is unsymmetrical about the virtual centerline of the armature. This non-symmetry of the driving device means that the sectional length of the belt 30 wound across the rollers, the contact area of the belt with each roller 27, 28, 32, 34a, 34b, and 35, and tensional and centrifugal force of the sectional belt 30 are not equally exerted. The construction of the conventional driving device 20 as described above causes a negligible tolerance in an armature, which does not require a high degree of accuracy. Considering the necessity of developing a highly precision armature, a broad range of usage of such armatures, and a rapid technological advancement, however, the convention driving device 20 of the armature balance machine embraces many problems, which must not be neglected in manufacturing a more precision armature. For example, the conventional driving device 20 of the armature balance machine has relatively more rollers and a longer belt 30. Therefore, it causes a noise from the roller and the belt, and the vibration thereof. Also, the length of the belt contacting the left and right hand side of the outer peripheral surface of the core 3 of the armature 1 is different, so that tension is not applied uniformly, and thus the uniform rotating power cannot be transferred.

Furthermore, in the driving device of the armature balance machine 20 as above described, the tension force applied to the belt 30 varies with the diameter of the core 3 of the armature 1 to be measured of the balance. Also, the tension changes according to the operation of the fingers 24a, 24b, which is associated with an armature replacement work. The above varying tension is compensated by a tension adjusting means 25 with an elastic portion such as a spring (not shown) provided therein. The structure of the tension adjusting means 25 is described in greater detail. In terms of the operation thereof, the tension adjusting means 25 must compensate the increased tensional force when the fingers 24a, 24b expands. It is however understood that the belt 30 itself wound across the section between the both sides of the core 3 of the armature 1 and the tension adjusting means 25 must absorb a certain extent of the tensional force and thus the resilient belt 30 is tensioned a little before the tension adjusting means 25 can function. As described above, the fact that the tension adjusting means 25 receives the tensional force through the belt 30 means that the tension applied to the belt 30 is not maintained in an optimum state, but varies with the diameter of the core 3 of the armature 1. Therefore, more accurate balance measurement of the armature cannot be achieved.

Technical Solution

The present invention has been made in order to solve the above problems in the art, and it is an object of the invention to provide a driving device of armature balance machine, in which a driving motor is formed on the same centerline of the armature, a hinge block pivot-connected by the hinge shaft is installed in the finger mounter of the bracket in such a manner that the hinge shaft is disposed on the same centerline of the driving motor and the variable roller is formed at one side of the hinge shaft, the finger provided with a complementary roller is symmetrically constructed about the centerline of the driving motor, and thereafter a belt is wound around each roller, so that the construction of the driving motor can be simplified and thus the length of the belt is minimized and the vibration of the belt is minimized, thereby enabling to keep the tension applied to the belt in an optimum state, due to the facts that the tension of the belt is symmetrical about the centerline of the belt and also the variable roller i.e. the tension adjusting means is not operated by the belt.

Advantageous Effects

The driving device of armature balance machine of the invention allows the construction of the driving device to be simplified minimally, so that the sectional length of the wound belt between the rollers can be minimized, thereby minimizing the vibration and sagging of the belt. Also, during the balance measurement an automatic stop function of the armature can be improved. The entire construction of the driving device is configured in such a manner as to be symmetric about the virtual centerline of the armature or on the same centerline. Therefore, the contacting area between the roller and the belt, the tensional and centrifugal force of the sectional belt are applied equally so that the armature rotates constantly, thereby enabling a stable balance measurement. Also, the balance of armatures having various diameters can be measured by means of the primary and the secondary compensation of the variation of tension. The primary tension compensation does not affect the belt, instead the tension of the belt is kept in an optimum state, so that more accurate armature balance measurement can be achieved, thereby resultantly producing an armature or motor of high grade and having great added value.

BRIEF DESCRIPTION OF DRAWINGS

Further objects and advantages of the invention can be more fully understood from the following detailed description taken in conjunction with the accompanying drawings, in which.

BEST MODE

The preferred embodiments of the present invention will be hereafter described in detail with reference to the accompanying drawings.

Figure 5:
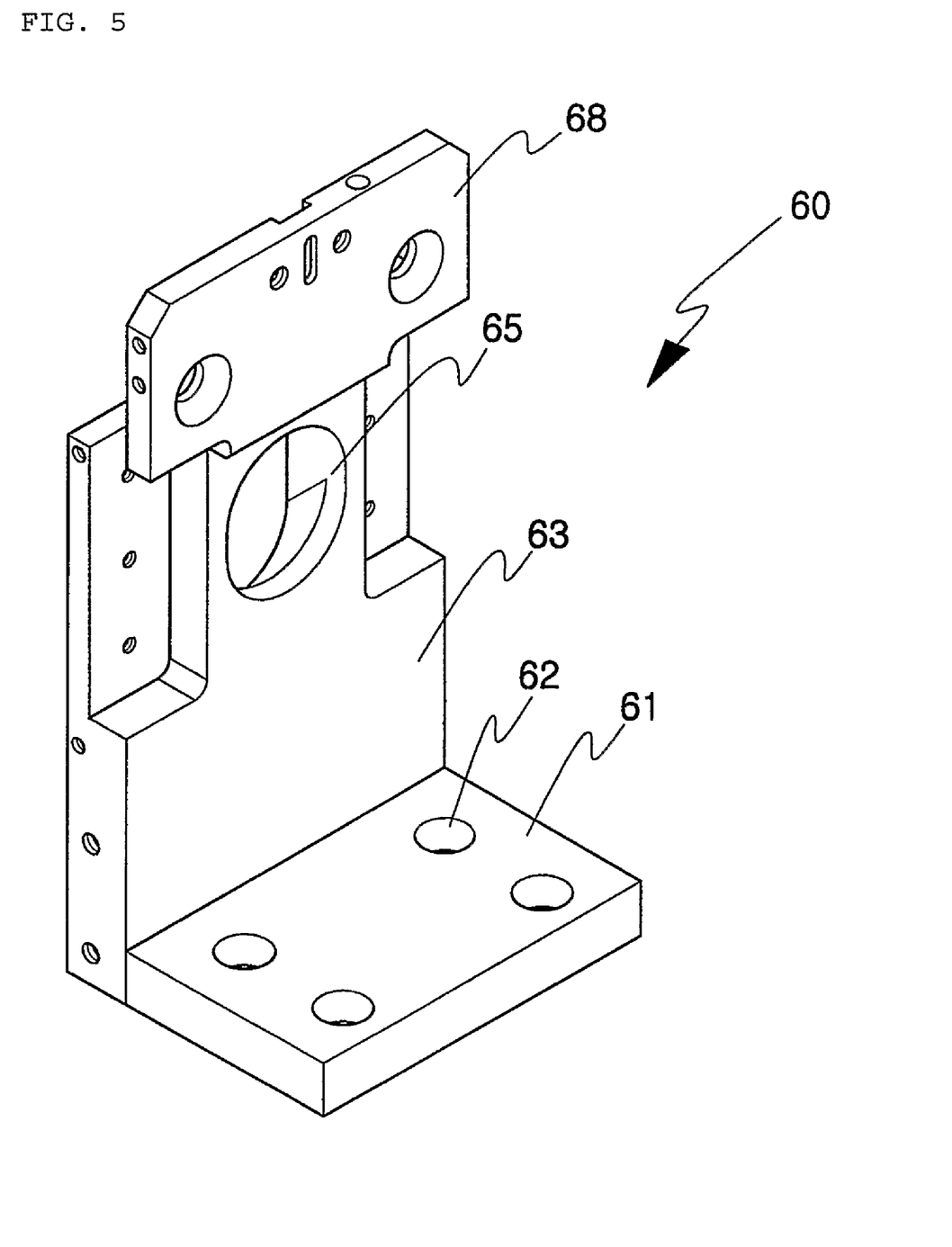
FIGS. 5 and 6 is show a perspective view showing a bracket of a driving device according to the invention.
Figure 6:
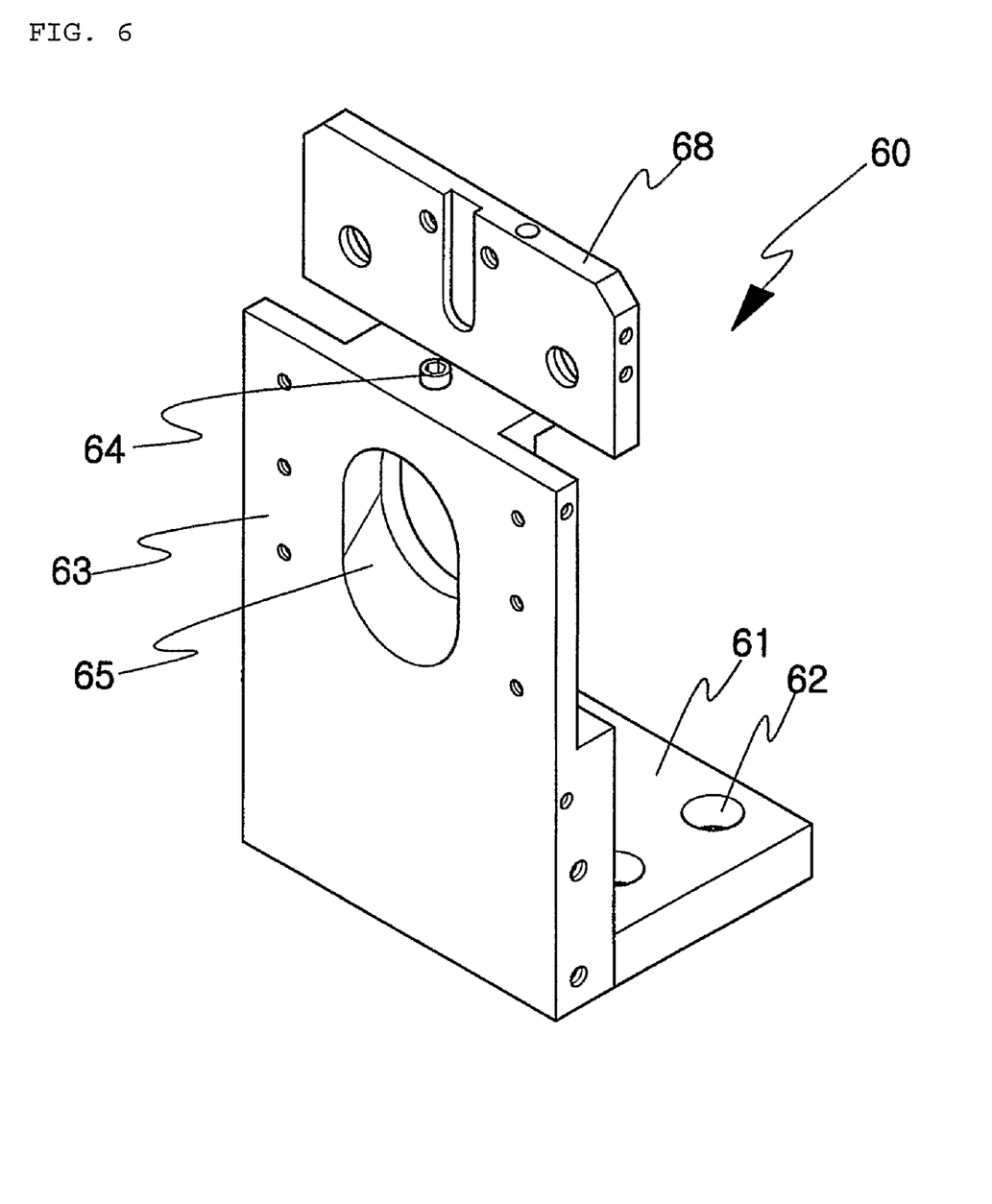

First, FIGS. 5 and 6 are perspective views showing a bracket of a driving device according to the invention. Referring to FIGS. 5 and 6, the constitution of the bracket of the driving device according to the invention is described. The bracket 60 of the driving device of the invention comprises a base 61 having multiple mounting holes 62 formed thereon in order to install the driving device to the balance machine, a body 63 having an oval-shaped through-hole formed in the center thereof and an adjust bolt 64 at the upper end thereof and formed perpendicularly to the base 61, and a finger mounter 68 integrally formed in the upper portion of the body 63.

Figure 7:
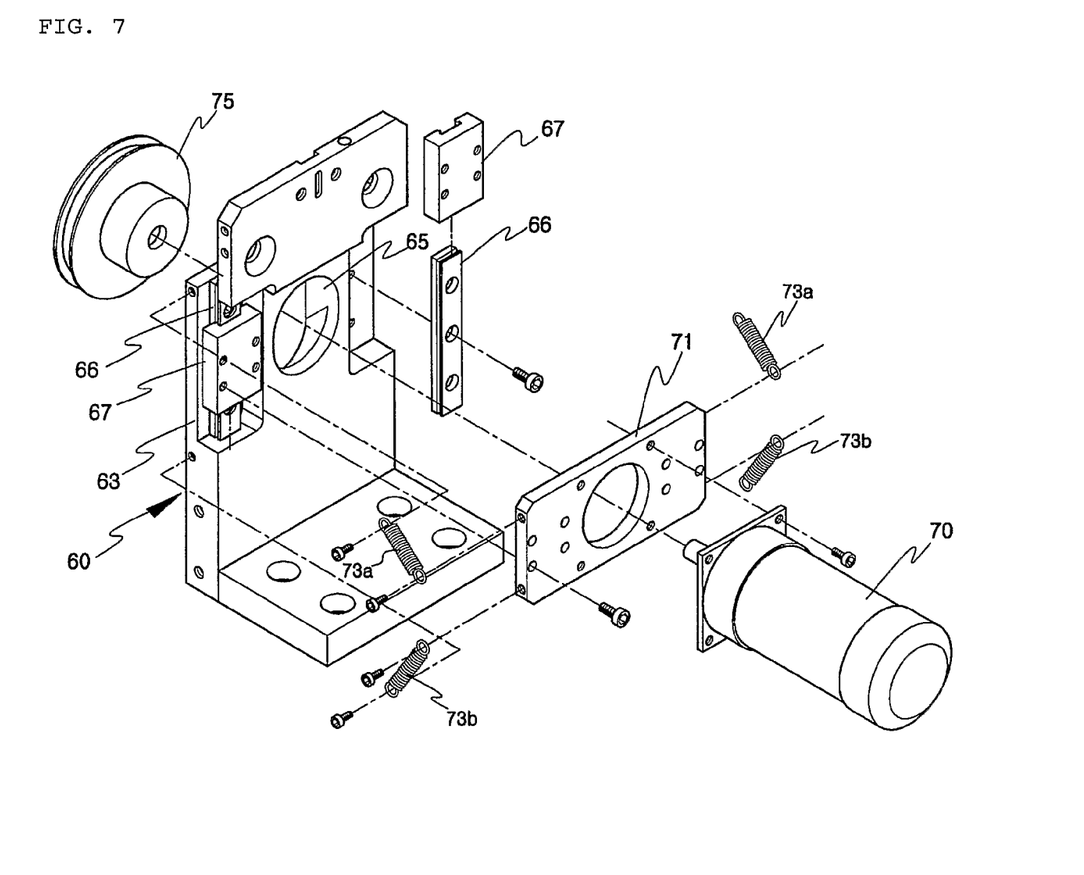
FIGS. 7 to 12 illustrate the construction and assembling procedure of a driving device of an armature balance machine according to the invention.
Figure 8:
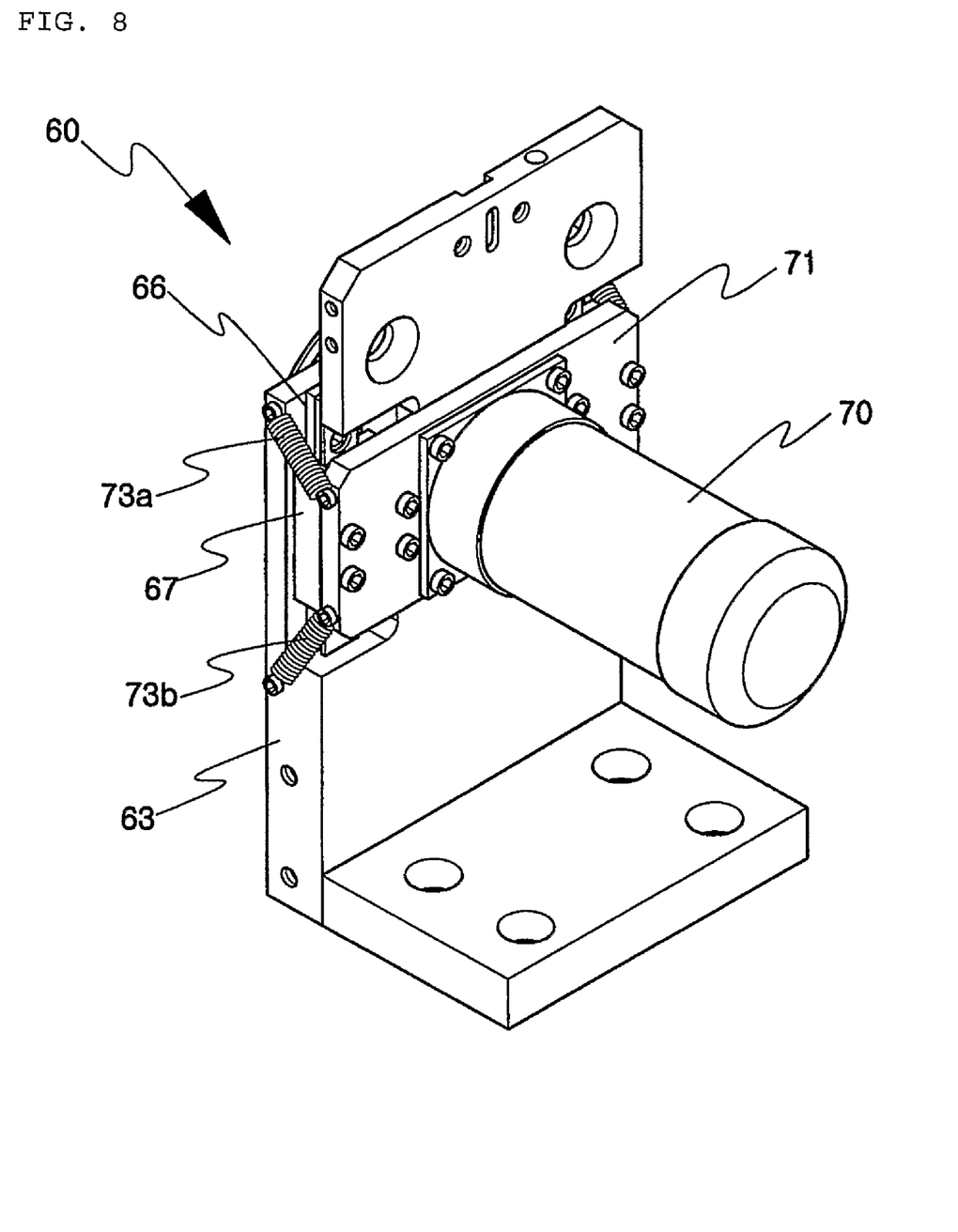
Figure 9:
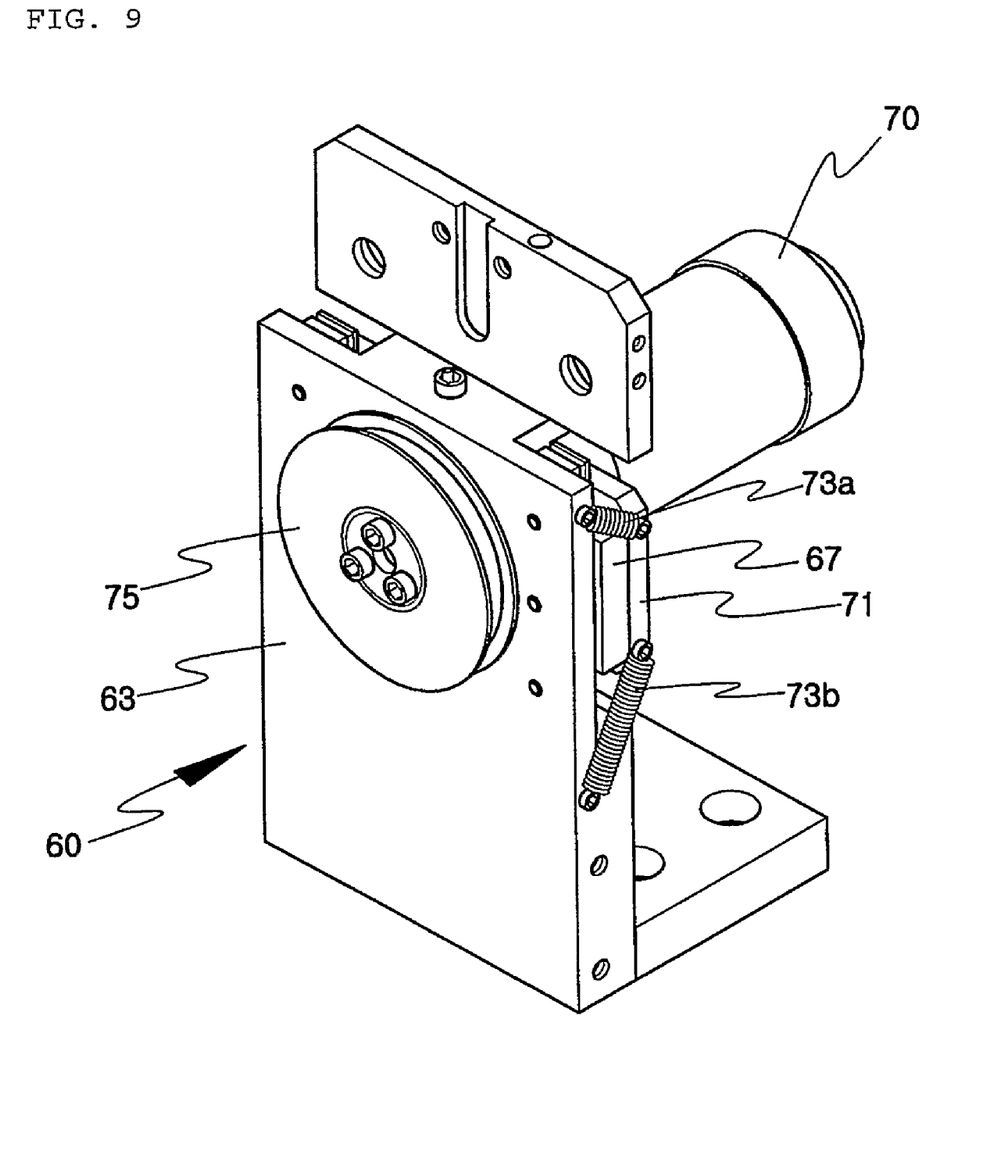

Referring to FIGS. 7, 8, and 9, the mounting structure of a driving motor 70, which is mounted on the bracket 60, is described in detail. On one side of the body 63 of the bracket 60 is formed a pair of the guide 66 to which the slider 67 is connected. A plate 71 having the drive motor 70 mounted thereon is mounted to the slider 67. A pair of upper and lower tension springs 73a and 73b are connected to the plate 71 and both sides of the body 63 of the bracket 60 in order that the driving motor 70 can move upwards and downwards by the elastic force of the spring. The rotating shaft of the driving motor 70 is mounted to the driving roller 75 in series passing through an insertion hole 65.

Figure 10:
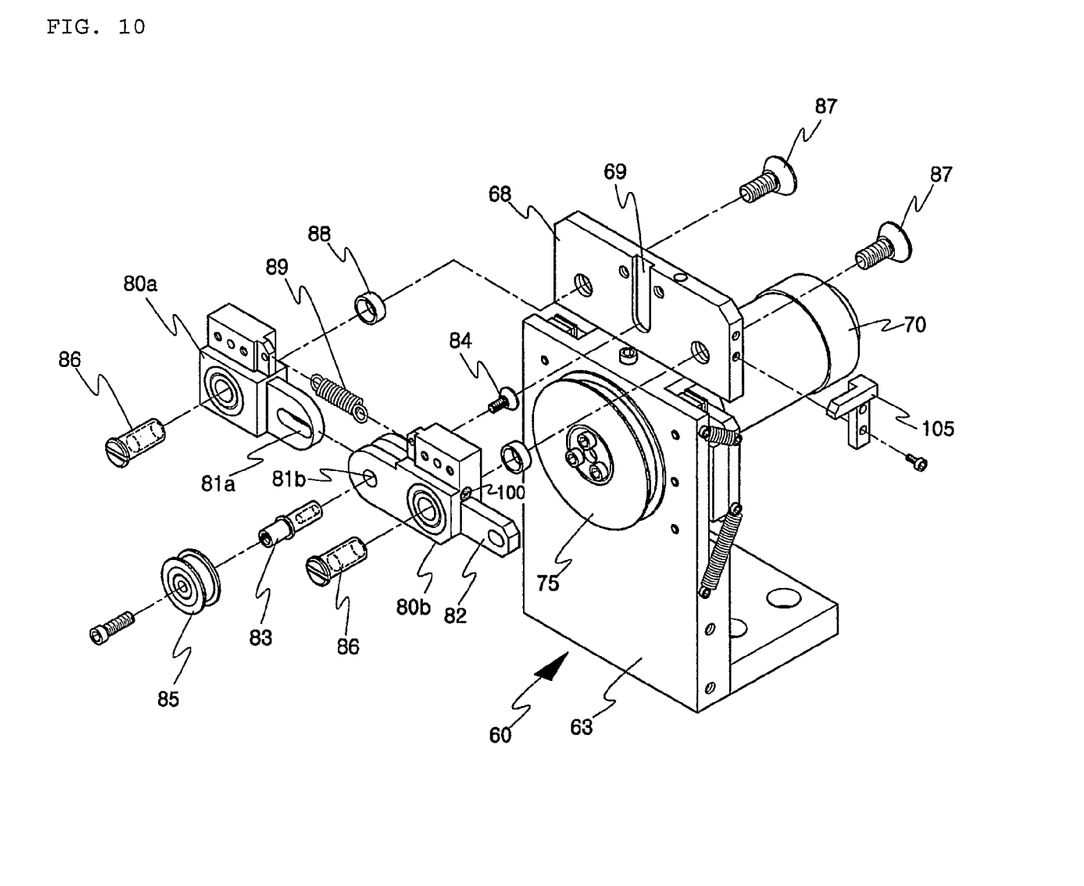
Figure 11:
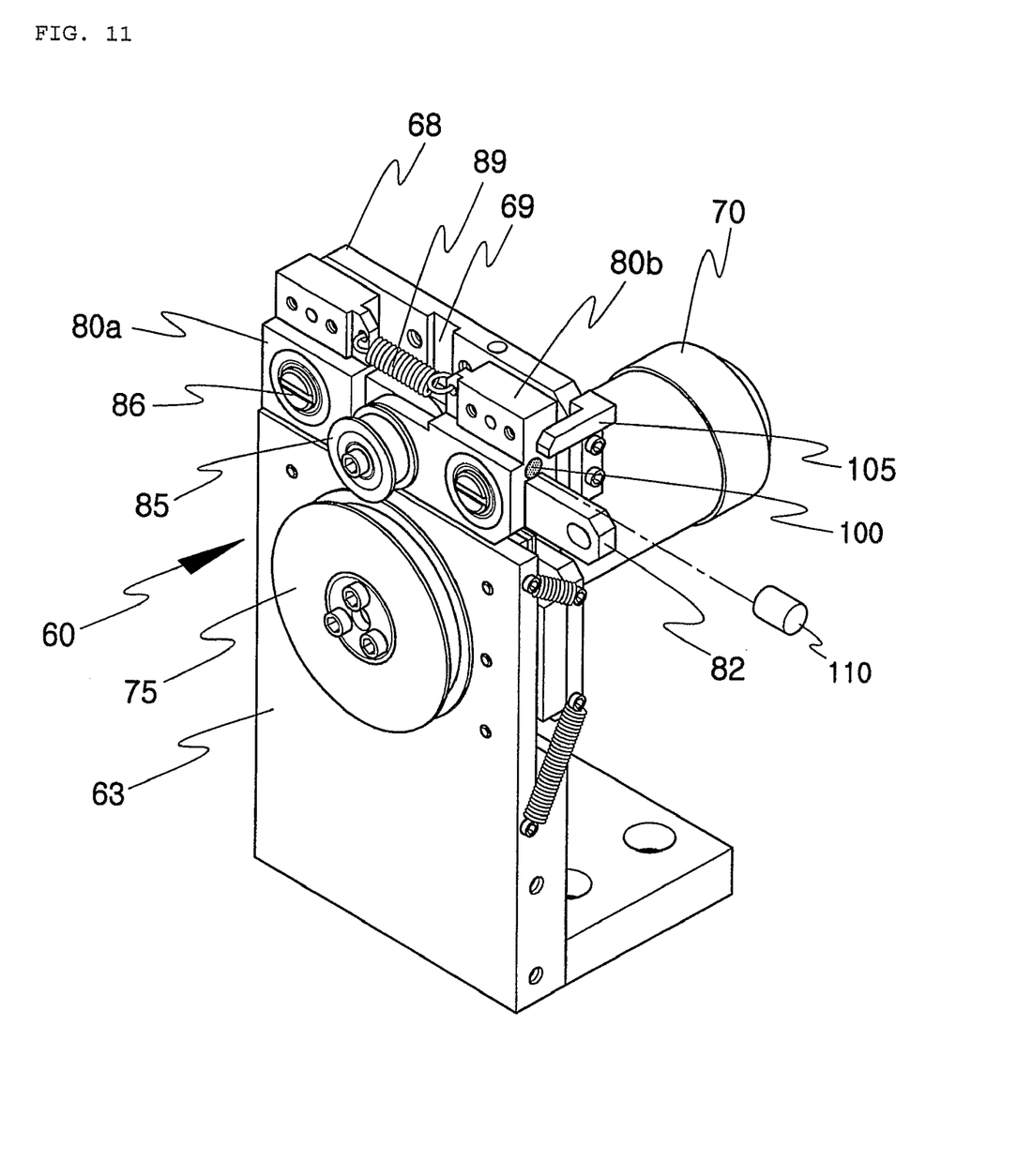

Referring to FIG. 10 and FIG. 11, a connection structure of hinge blocks 80a and 80b and a variable roller 85 is described. The finger mounter 68 is integrally formed in the upper portion of the body 63 of the bracket 60 having the driving motor 70 mounted thereon. A pair of the hinge blocks 80a and 80b connected to each other by the tension spring 89 is rotatably installed in the finger mounter 68 by the center shaft 86 and the mounting bolt 87. Hinge mounting holes 81a and 81b are formed on each facing side of the hinge blocks 80a and 80b. The hinge shaft 83 and the hinge bolt 84 are connected to the blocks. The head of the hinge bolt 84 is inserted to a guide groove 69 which is formed on the finger mounter 68 of the bracket 60. The variable roller 85 is inserted and mounted to the other side of the hinge shaft 83 to which the hinge bolt is mounted. The variable roller 85 is disposed on the upper side of the same central axis of the driving roller 75 which is mounted to the driving motor 70.

On the other hand, a mounting projection 82 is formed on one side of the hinge block 80b. A magnet 100 is inserted into the upper side of the mounting projection 82 in order to fix the gauge block 110. A supporting bracket 105, which is protruded to and contacted with the upper side of the fixed gauge block 110 is formed in one side of the finger mounter 68. In the figure, unexplained reference numeral 88 indicates a collar 88, which maintains the space between the hinge blocks 80a and 80b and the finger mounter 68.

Figure 12:
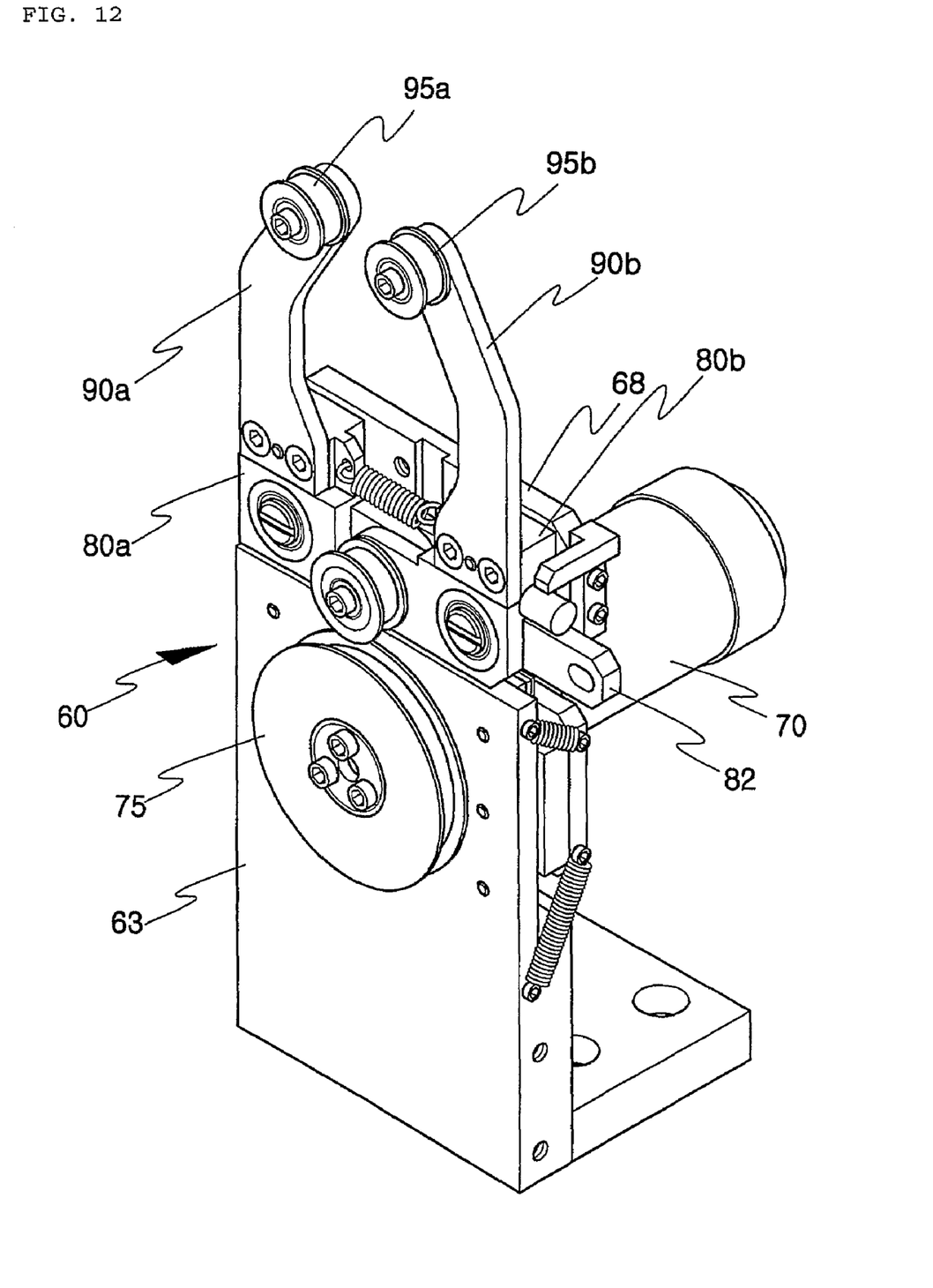
Figure 13:
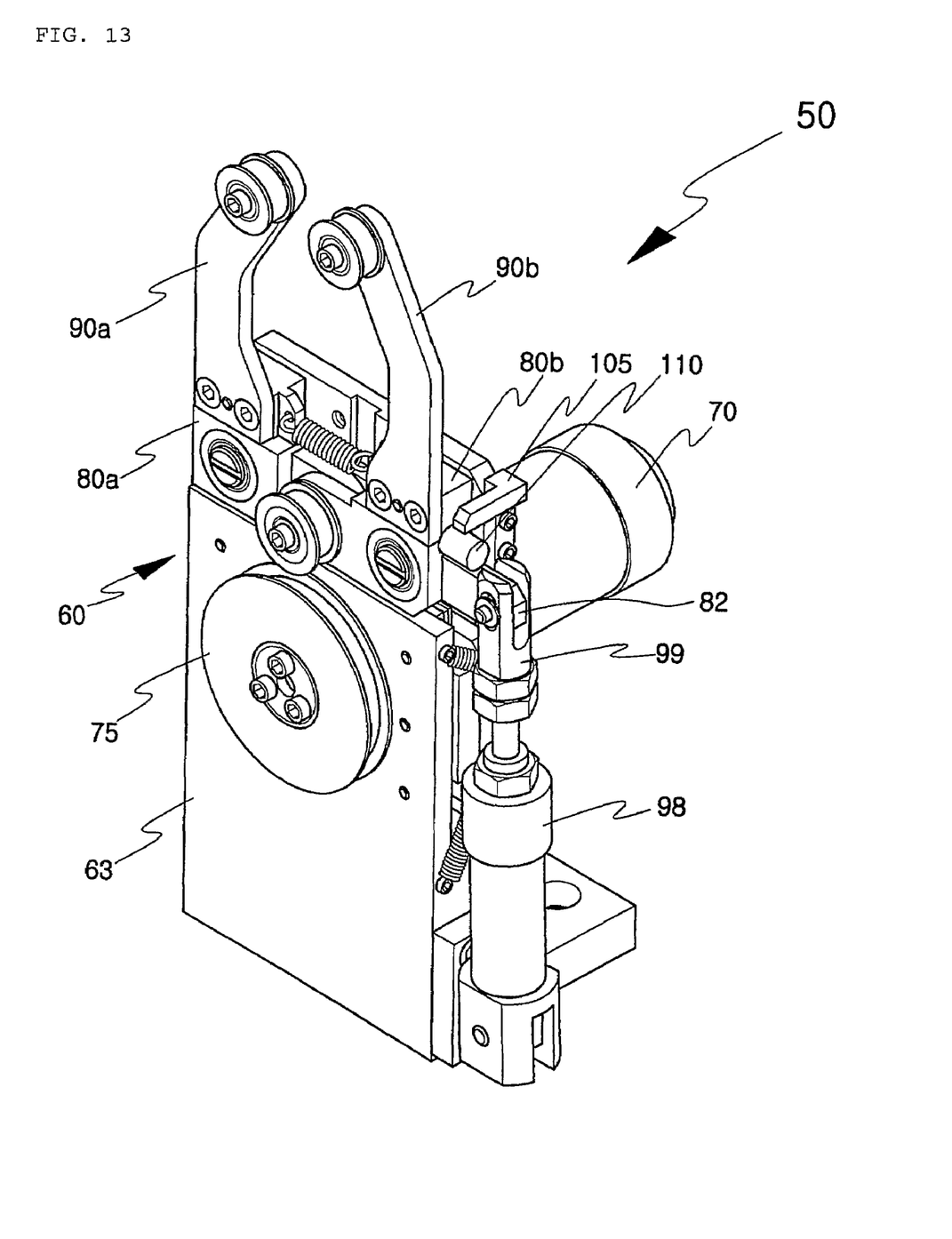
FIG. 13 is a perspective view of the driving device of the armature balance machine according to the invention.

Referring to FIGS. 12 and 13, the construction of the pair of the finger 90a and 90b and the finger driving means is described. A pair of symmetric fingers 90a and 90b is connected respectively to the pair of the hinge blocks 80a and 80b, which is mounted to the finger mounter 68 of the bracket 60. Complementary rollers 95a and 95b are provided respectively at the end of each finger 90a and 90b. The pair of the fingers 90a, 90b is formed in such a manner as to be symmetric about the virtual centerline of the driving roller 75 installed to the driving motor 70. The fingers 90a and 90b are operated by the pneumatic cylinder 98, which is provided at one side of the body 63 of the bracket 60. That is, a mounting protrusion 82 formed in one side of the hinge block 80b is connected to the connecting bar 99 of the pneumatic cylinder, thereby operating the pair of the fingers 90a and 90b.

Figure 14:
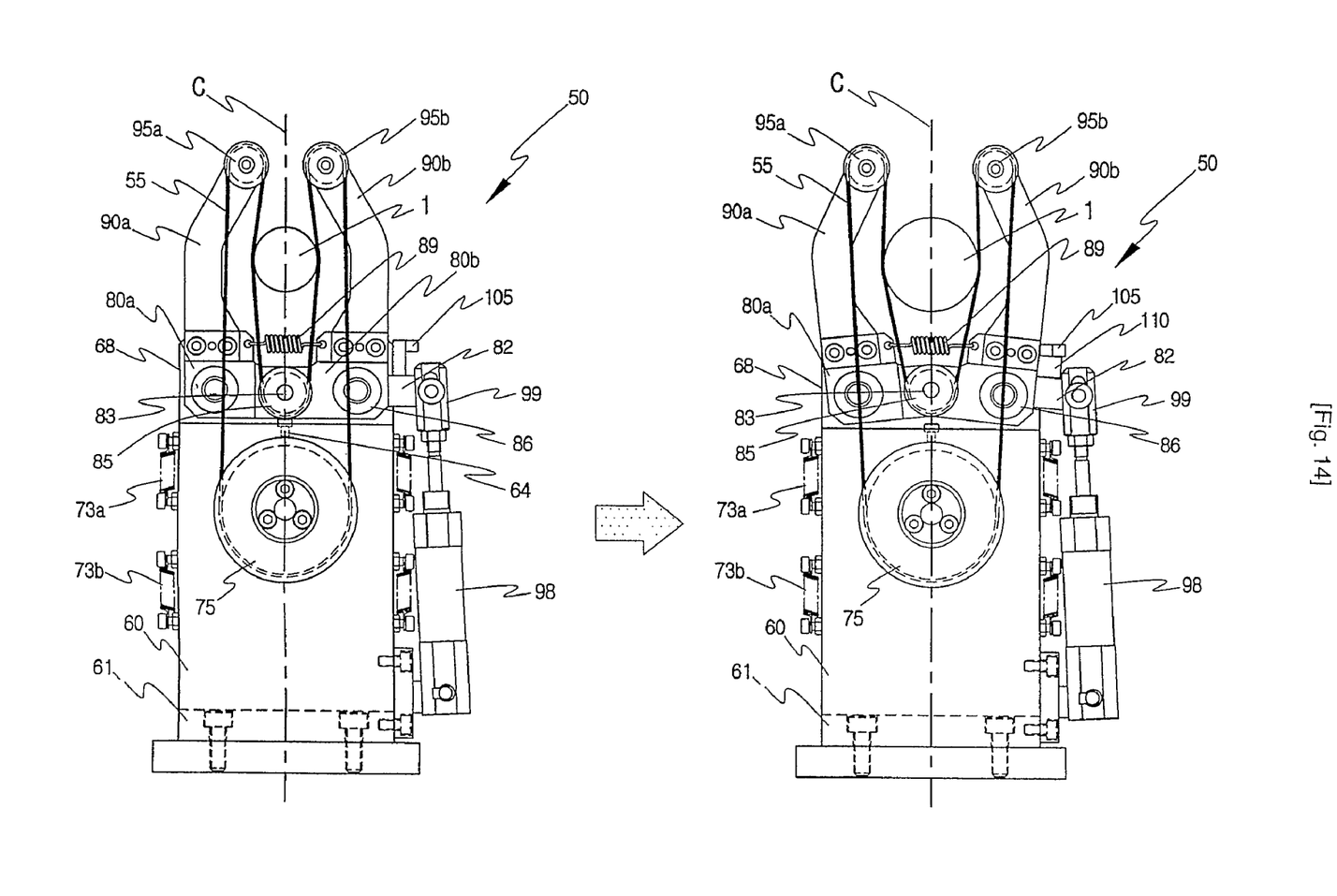
FIG. 14 illustrates an operating state-of the driving device of the armature balance machine according to the invention.

Also, each of the rollers 75, 85, 95a, and 95b of the driving device 50 is wound with a belt 55 (FIG. 14). An operation effect of the driving device of the armature balance machine according to the present invention constructed as above is described below in detail, referring to FIGS. 13 and 14. The driving motor 70 is disposed on the same centerline C of the armature 1 of which balance is to be measured. A pair of the fingers 90a and 90b, the complementary rollers 95a and 95b, the variable roller 85, and the driving roller 75 are disposed on the same centerline C of the armature 1 or constructed in such a manner as to be symmetric about the centerline C. Therefore, the sectional length of the wound belt 55 between each roller, contact surface area of the belt 55 and each roller, and the tensional and centrifugal force of the sectional belt 55 are applied equally. Also, the tension of the belt 55 contacted with both side faces of the armature 1 core is exerted uniformly so that the armature can be rotated in more stable and uniform fashion, and the transfer path of the belt 55 is minimized. The belt 55 can be relatively shorter, thus the vibration of the belt 55 can be minimized, and more accurate weight balance measurement of the armature 1 can be achieved, as compared with the conventional ones, thereby producing an armature and motor of high quality and having added value.

Also, in the driving device of the armature balance machine according to the present invention, in case where tension on the belt 55 varies due to an expansion of the fingers 90a and 90b during the balance measurement of an armature having a bigger diameter or the replacement of the armature, it is constructed such that the varying tension is compensated by the variable roller 85. Dissimilar to the conventional way using the belt 55 operation, the variable roller 85 moves up and downward by the operation of the hinge blocks 80a and 80b. As the pair of the fingers 90a, 90b becomes apart from each other, the variable roller 85 moves upwards due to the movement of the hinge axis 83, and compensate the change in the tension of the belt 55. As the fingers 90a and 90b returns to the original position, the variable roller 85 moves downwards due to the movement of the hinge shaft 83, and thus the operation of the hinge block 80a, 80b and the finger 90a, 90b compensates the tension without affecting the belt 30 which contacts the armature core. Therefore, the tension of the belt 30 can be kept in an optimum state, regardless of the core diameter of the armature 1.

Also, in case where the tension changes beyond a primary compensation limit of the variable roller 85, the driving roller 75 moves upwards and downwards to thereby compensate the tension change. The driving roller 75 is connected in series to the driving motor 70, and the driving motor 70 is mounted by means of the plate 71 on the slider 67 which is connected to the guide 66. The plate 71 moves upwards and downward by a restoration force by a pair of the extension springs 73a and 73b disposed at the top and bottom of both sides of the plate 71. Therefore, the tension of the belt 55 can be secondarily compensated, and a wide range of compatibility can be achieved in the diameter of the armature 1 (FIGS. 8, 9, and 14). It is desirable that the weight of the driving motor 70 and the driving roller 75, the elastic force of each tension spring 73a and 73b, and the tension of the belt 55 are optimized, so that the driving motor 70 can be disposed at the center of the oval shaped insertion hole 65 formed on the body 63 of the bracket 60 so as to move upwards and downwards.

On the other hand, the pair of fingers 90a and 90b is expanded uniformly by an operation of the pneumatic cylinder 98, and restored by the tension spring 89 connecting the pair of the hinge blocks 80a and 80b. By adjusting the mounting depth of the adjusting bolt 64 which is mounted to the upper end of the body 63, a dropping point of the hinge blocks 80a and 80b is limited, thereby establishing the initial setup of the operational range of the fingers 90a and 90b. Also, depending on the diameter of the armature 1, a gauge block 110 having various diameters is fixed to the magnet 100 formed in one side of the hinge block 80b. Therefore, the operation range of the fingers 90a and 90b is limited by a gauge block 110 on the mounting protrusion 82 and the supporting bracket 105 in the upper side of the gauge block 110. Also, in case where the armature has a larger diameter, the tension of the belt 55 can be maintained constantly. In this way, the working range of the mechanism can be minimized, and the operation time can be reduced effectively in the aspect of the production management.

MODE FOR INVENTION

In order to accomplish the above object, according to one aspect of the invention, there is provided a driving device of an armature balance machine, in which a belt for transferring rotation power of the driving motor to the outer peripheral surface of an armature core and a plurality of rollers with the belt wound therearound are formed in bracket. In the driving device of the armature balance machine, a pair of guides 66 with the slider 67 coupled thereto is formed at one side of the bracket 60 having an inserting hole 65 formed therein. A driving motor 70 with a driving roller 75 connected in series passing through the insertion hole 65 is attached to the slider 67 with a plate 71. A pair of upper and lower tension springs is connected to the plate 71 and both sides of the bracket 60. A pair of hinge blocks 80a, 80b connected to each other by the tension spring 89 is rotatably mounted to an upper side of the bracket 60. Each of the hinge blocks 80a and 80b is hinged with a hinge shaft 83 and a hinge bolt 84 in such a way that the hinge shaft 83 is disposed on a same centerline as the driving roller 75, a variable roller 85 is formed in the end thereof, and the hinge bolt 84 is inserted to a guide groove 69 formed in the upper portion of the bracket 60. A pair of fingers 90a, 90b each having complementary rollers 95a and 95b, respectively, is installed in the pair of the hinge blocks 80a and 80b respectively in such a manner as to be symmetrical about a virtual centerline of the driving roller 75. A pneumatic cylinder 98 provided in the bracket 60 is mounted to a mounting protrusion 82 formed at one side of the hinge block 80b. A belt 55 is wound around the rollers 75, 85, 95a, and 95b.

In one preferred embodiment, an adjusting bolt 64 is connected to the upper end of the bracket 60 where the lower end of the hinge blocks 80a and 80b is contacted.

In another preferred embodiment, a magnet 100 is formed in the upper side of the mounting protrusion 82 of one hinge block 80b. A gauge block 110 is fixed to the magnet 100 in such a manner that it is rested on the mounting protrusion 82, and a supporting bracket 105 protruded to the upper side of the gauge block 110 is formed at one side of a finger mounter 68.

INDUSTRIAL APPLICABILITY

As described above, according to the driving device of armature balance machine of the invention, the construction of the driving device is simplified minimally, so that the sectional length of the wound belt between the rollers can be minimized, thereby minimizing the vibration and sagging of the belt. Also, during the balance measurement an automatic stop function of the armature can be improved. The entire construction of the driving device is configured in such a manner as to be symmetric about the virtual centerline of the armature or on the same centerline. Therefore, the contacting area between the roller and the belt, the tensional and centrifugal force of the sectional belt are applied equally so that the armature rotates constantly, thereby enabling a stable balance measurement. Also, the balance of armatures having various diameters can be measured by means of the primary and the secondary compensation of the variation of tension. The primary tension compensation does not affect the belt, instead the tension of the belt is kept in an optimum state, so that more accurate armature balance measurement can be achieved, thereby resultantly producing an armature or motor of high grade and having great added value.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A driving device of an armature balance machine in which a belt for transferring rotation power of the driving motor to the outer peripheral surface of an armature core and a plurality of rollers with the belt wound therearound are formed in a bracket, wherein a pair of guides with a pair of sliders coupled thereto is formed at one side of the bracket having an inserting hole formed therein;

wherein a driving motor with a driving roller connected in series passing through the insertion hole is attached to the pair of sliders with a plate, and a pair of first upper and lower tension springs are connected to the plate and both sides of the bracket;

wherein a pair of hinge blocks connected to each other by a second tension spring is rotatably mounted to an upper side of the bracket, and each hinge block is hinged with a hinge shaft and a hinge bolt in such a way that the hinge shaft is disposed on a same centerline as the driving roller, a variable roller is formed in the end thereof, and the hinge bolt is inserted to a guide groove formed in the upper portion of the bracket;

wherein a pair of fingers each having a complementary roller respectively is installed in the pair of the hinge blocks in such a manner as to be symmetrical about a virtual centerline of the driving roller, and a pneumatic cylinder provided in the bracket is mounted to a mounting protrusion formed at one side of the hinge block; and wherein a belt is wound around the rollers.

2. The driving device according to claim 1, wherein an adjusting bolt is connected to the upper end of the bracket where the lower end of the hinge blocks is contacted.

3. A driving device according to claim 1, wherein a magnet is formed in the upper side of the mounting protrusion formed at one side of the hinge block, a gauge block is fixed to the magnet in such a manner that it is rested on the mounting protrusion, and a supporting bracket protruded to the upper side of the gauge block is formed at one side of a finger mounter.

\* \* \* \* \*